United States Patent
Cirit

(10) Patent No.: US 10,111,043 B1
(45) Date of Patent: Oct. 23, 2018

(54) VERIFYING SENSOR DATA USING EMBEDDINGS

(71) Applicant: Uber Technologies, Inc., San Francisco, CA (US)

(72) Inventor: Fahrettin Olcay Cirit, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 15/495,686

(22) Filed: Apr. 24, 2017

(51) Int. Cl.
| | |
|---|---|
| *H04W 4/029* | (2018.01) |
| *H04W 4/02* | (2018.01) |
| *H04W 4/04* | (2009.01) |
| *G08G 1/00* | (2006.01) |
| *H04L 29/08* | (2006.01) |

(52) U.S. Cl.
CPC ............ *H04W 4/029* (2018.02); *G08G 1/205* (2013.01); *H04W 4/023* (2013.01); *H04W 4/028* (2013.01); *H04W 4/046* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2010/0127920 A1 | 5/2010 | Harper et al. | |
| 2011/0066369 A1 | 3/2011 | Klassen et al. | |
| 2011/0080302 A1 | 4/2011 | Muthaiah et al. | |
| 2012/0290166 A1* | 11/2012 | Wallace | G07C 5/085 |
| | | | 701/29.2 |
| 2015/0018008 A1 | 1/2015 | Schlesinger et al. | |
| 2017/0057528 A1* | 3/2017 | Green | B61L 25/025 |
| 2017/0090036 A1 | 3/2017 | Zalewski et al. | |
| 2017/0278409 A1* | 9/2017 | Johnson | G08G 5/0069 |

OTHER PUBLICATIONS

Lin, J. et al., "Finding Structural Similarity in Time Series Data Using Bag-of-Patterns Representation," International Conference on Scientific and Statistical Database Management, Scientific and Statistical Database Management 2009, Lecture Notes in Computer Science 5566, M. Winslett (Ed.), 2009, pp. 461-477.

(Continued)

*Primary Examiner* — Frantz Bataille
(74) *Attorney, Agent, or Firm* — Fenwick & West LLP

(57) ABSTRACT

A network system analyzes data samples using embeddings based on, for example, symbolic representations of the data samples or representations in latent dimension space. The network system coordinates providers who provide geographical location-based services to users. The network system may receive data samples from the client device of a provider. For instance, a sensor of the client device captures the data samples during a transportation service along a particular route. To verify that the data samples accurately indicate the location or movement of the provider, the network system can generate a test embedding representing the data samples and compare the test embedding with a reference embedding. The reference embedding is generated based on data samples captured for other similar services, e.g., corresponding to providers who also provided transportation services along the same particular route.

20 Claims, 7 Drawing Sheets

(56) References Cited

OTHER PUBLICATIONS

Senin, P. et al., "SAX-VSM: Interpretable Time Series Classification Using SAX and Vector Space Model," 2013 IEEE 13$^{th}$ International Conference on Data Mining (ICDM), Dec. 7-10, 2013, 6 pages.
PCT International Search Report and Written Opinion, PCT Application No. PCT/IB2018/051497, dated Jun. 20, 2018, 11 pages.

* cited by examiner

500

Receive data including a data sample for a set of sensors and characteristics of the data sample
510

↓

Generate a test embedding for the data sample
520

↓

Identify a reference embedding for a set of reference characteristics corresponding to the characteristics of the data sample
530

↓

Determine a similarity score between the test embedding and the reference embedding
540

↓

Verify that the data sample was captured while the set of sensors were subject to the set of reference characteristics
550

FIG. 5

VERIFYING SENSOR DATA USING EMBEDDINGS

BACKGROUND

1. Field of Art

The present disclosure generally relates to verifying sensor data, and more specifically to comparing embeddings that represent sensor data.

2. Description of the Related Art

In a system, providers provide geographical location-based services to users, for example, a provider uses a vehicle to transport a user or to deliver an item. Providers have client devices that provide information about the location or movement of the client devices. For example, the provider carries a smartphone client device in the provider's vehicle during services. The smartphone has a global positioning system (GPS) sensor that provides sensor data such as location information to the system. The system may use the sensor data to verify that a provider provided a service. However, providers may try to spoof the system by using their client devices to provide fictitious sensor data and simulate providing the service. If the system cannot differentiate fictitious sensor data from proper sensor data, the system will not be able to verify whether a provider actually provided a service. Additionally, it may also be particularly challenging to verify sensor data at a large scale because processing large amounts of raw sensor data can be computationally expensive. It would be desirable for the system to identify fictitious sensor data, and to do so efficiently at large scale.

SUMMARY

In one embodiment, a method comprises receiving, by a network system from a client device, data associated with sensor information of the client device and associated with a trip record. The data includes a data sample for a set of sensors of the client device and one or more characteristics of the data sample. The network system generates a test embedding for the data sample, where the test embedding uses a number of latent dimensions that represent at least a portion of the data sample. The network system identifies a reference embedding for a set of reference characteristics, where the set of reference characteristics corresponds to at least one of the one or more characteristics of the data sample. The reference embedding are based on a set of embeddings each using the number of latent dimensions that represent sensor data for a set of trip records associated with the set of reference characteristics. The network system determines a similarity score between the test embedding corresponding to the trip record and the reference embedding by comparing each latent dimension of the test embedding and a corresponding latent dimension of the reference embedding. The network system verifies, in response to the similarity score exceeding a threshold score, that the data sample was captured while the set of sensors were subject to the set of reference characteristics.

BRIEF DESCRIPTION OF DRAWINGS

Figure (FIG. 1 is a diagram of a system environment for a network system according to one embodiment.

FIG. 5 is a flowchart illustrating a process for verifying sensor data according to one embodiment.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A network system coordinates providers who provide geographical location-based services to users. The location-based services may include transportation of users or goods. To determine information about routes of a trip traveled by a provider or user, the network system receives data samples from a client device of the provider or user. For example, a sensor of a provider's client device captures the data samples during the trip, where the data samples include sensor data describing the location of the client device, and in extension, the supposed location of the provider. To verify that the sensor data accurately indicates the location or movement of the provider, the network system can generate a test embedding representing the data samples and compare the test embedding with reference embeddings. The reference embeddings are generated for data samples captured during other similar services, e.g., trips along similar routes. If the test embedding and reference embeddings are similar, the network system can verify the likelihood that the provider did indeed travel the routes of the trip. The embeddings can represent various lengths of sensor data (e.g., 30 seconds, multiple minutes, and/or a long trip) in an embedding of the same vector length, permitting the addition, subtraction, and other operations of the embeddings for comparison of trips having various lengths. The embedding of the same vector length may also permit comparison to reference embeddings that summarize a large number of trips having similar reference characteristics.

I. System Overview

Figure 1:
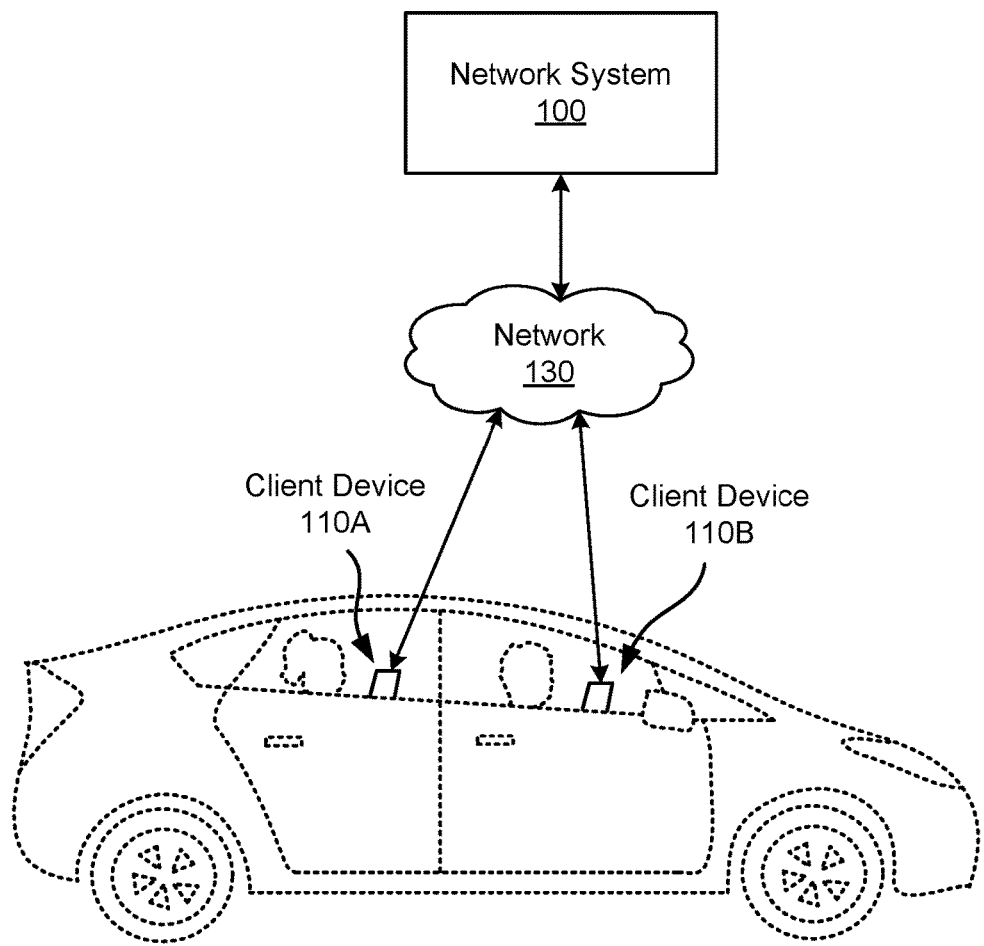

Figure (FIG. 1 is a diagram of a system environment for a network system 100 according to one embodiment. Users of the network system 100 may include providers that provide service to other users. In an example use case, a provider operates a vehicle to transport a user from a first location (e.g., an origin or pickup location) to a second location (e.g., a drop-off location). Other types of service include, for example, delivery of goods (e.g., mail, packages, or consumable items) or services. During or after performance of a service, a client device 110A and 110B may report sensor data relating to the performance of the service to the network system 100 for the network system 100 to verify the performance of the service and otherwise determine if the sensor data is consistent with trips having similar characteristics as the provided service.

The system environment includes the network system 100 and one or more client devices 110 of users of the network system 100, for example, client device 110A of a user and client device 110B of a provider providing service to the user, which may be collectively or individually referred to herein as a "client device 110" or "client devices 110." The various systems shown in FIG. 1 are connected to each other via a network 130. In other embodiments, different and/or additional entities can be included in the system architecture. The functions performed by the various entities of FIG. 1 may vary in different embodiments.

A user can interact with the network system 100 through the client device 110, e.g., to request transportation or to receive requests to provide transportation. As described herein, a client device 110 can be a personal or mobile computing device, such as a smartphone, a tablet, or a notebook computer. In some embodiments, the client device 110 executes a client application that uses an application programming interface (API) to communicate with the network system 100 through the network 130. The client application of the client device 110 can present information received from the network system 100 on a user interface, such as a map of the geographic region and the current location of the client device 110. The client application running on the client device 110 can determine the current location and provide the current location to the network system 100.

In one embodiment, the networking system 100 coordinates trips between users and providers. In this example, through operation of the client device 110, a user makes a trip request to the network system 100 requesting a provider. For example, the trip request may include user identification information, the number of passengers for the trip, a requested type of the provider (e.g., a vehicle type or service option identifier), the current location and/or the origin location (e.g., a user-specific geographical location for pickup, or a current geographical location of the client device 110), and/or the destination for the trip. The current location (or origin location) of the client device 110 may be designated by the user (e.g., based on an input string of text or audio/voice signal), or detected using a sensor of the client device 110 such as a GPS sensor. The user may also input feedback via a user interface of the client device 110, e.g., the user inputs text-based feedback or feedback represented as a rating using a touchscreen keyboard of the client device 110. Before, during, or after the trip, the client device 110 can provide the feedback to the network system 100. The network system 100 can generate a trip record for the trip request, and associate information about the corresponding trip with the trip record.

In some embodiments, a provider uses a client device 110 to interact with the network system 100 and receive invitations to provide service for users. For example, the provider is a person operating a vehicle capable of transporting users. In some embodiments, the provider is an autonomous vehicle that receives routing instructions from the network system 100. For convenience, this disclosure generally uses a car as the vehicle, which is operated by a driver as an example provider. However, the embodiments described herein may be adapted for a provider operating alternative vehicles (e.g., boat, airplane, helicopter, etc.) or vehicles that do not necessarily need to be operated by a person.

In some embodiments, a provider can receive invitations or assignment requests through a client device 110. An assignment request identifies a user who submitted a trip request to the network system 100 and determines the origin location and/or the destination of the user for a trip. For example, the network system 100 can receive a trip request from a client device 110 of a user, select a provider from a pool of available (or "open") providers to provide the trip, e.g., based on the determined origin location and/or the destination. The network system 100 transmits an assignment request to the selected provider's client device 110.

Client devices 110 can communicate with the network system 100 via the network 130, which may comprise any combination of local area and wide area networks employing wired or wireless communication links. In one embodiment, the network 130 uses standard communications technologies and Internet protocols. For example, the network 130 includes communication links using technologies such as the Internet, 3G, 4G, BLUETOOTH®, or WiFi. In some embodiments, all or some of the communication links of the network 130 may be encrypted.

In some embodiments, one or more sensors may be included in the client devices 110. The sensors can capture sensor data during services provided by providers and may include, for example, a motion sensor (e.g., accelerometer, gyroscope, magnetometer, or inertial measurement unit (IMU)), GPS sensor, audio sensor, camera, or any other type of suitable sensor. The client device 110 can aggregate sensor data as a data sample (e.g., telematics data), and provide the data sample to the network system 100 via the network 130. In embodiments where the client device 110 is coupled to a vehicle (e.g., the client device 110 is held in place by a mount physically coupled to the dashboard or windshield of a car), sensor data captured by a motion sensor of the client device 110 is representative of movement of the vehicle.

In addition, or alternatively, to the one or more sensors included in the client device 110, one or more sensors may be a standalone device that is located or coupled to a vehicle of a provider, in some embodiments. For example, a sensor is communicatively coupled to the on-board diagnostics (OBD-II) connector of the car. The sensor receives data samples via the OBD-II connector including mileage, fuel usage, engine status, vehicle transmission data, braking system data, warning signals (e.g., check engine light), geographical location, etc. The sensor provides the data samples to the network system 100 via the network 130, e.g., in real-time or at a time after a trip.

II. Example System Architecture

Figure 2:
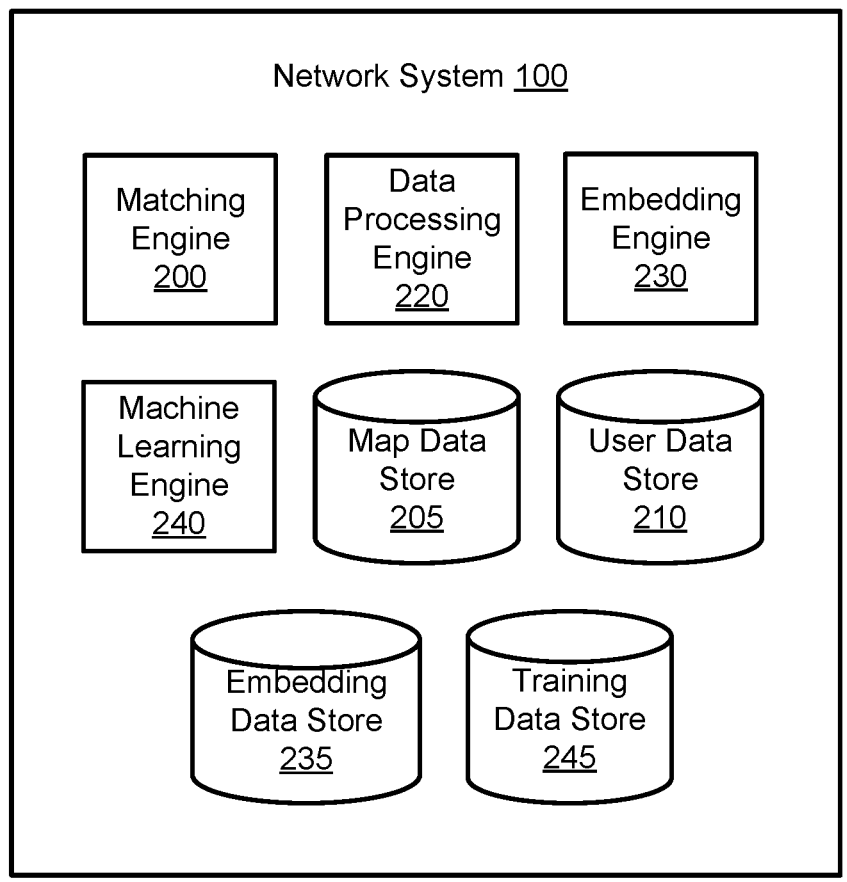
FIG. 2 is a block diagram illustrating the architecture of the network system according to one embodiment.

FIG. 2 is a block diagram illustrating the architecture of the network system 100 according to one embodiment. The network system 100 includes a matching engine 200, map data store 205, user data store 210, data processing engine 220, embedding engine 230, embedding data store 235, machine learning engine 240, and training data store 245. In other embodiments, the network system 100 may include additional, fewer, or different components for various applications. Conventional components such as network interfaces, security functions, load balancers, failover servers, management and network operations consoles, and the like are not shown so as to not obscure the details of the system architecture.

In some embodiments, users or providers use their client devices 110 to register with the network system 100, for example, by creating accounts and providing user information (e.g., contact information, a home or office address, or billing information) to the network system 100. The network system 100 can store the user information as well as information associated with trip records of the users or providers in the user data store 210. For instance, information for trip records describes trips that a user received from providers, trips that a provider provided to users, or other types of trips such as delivery services provided by providers. The network system 100 can associate feedback received from a user or data from trip records with registered accounts of users or providers.

The matching engine 200 selects providers to service the requests of users. For example, the matching engine 200 receives a trip request from a user and determines a set of candidate providers that are online, open (e.g., are available to transport a user), and near the requested origin (e.g., pickup) location for the user, e.g., based on map information from a data source. The matching engine 200 selects a provider from the set of candidate providers to which it transmits an assignment request. The provider can be selected based on the provider's location, the origin and/or destination location, the type of the provider, the amount of time the provider has been waiting for an assignment request and/or the destination of the trip, among other factors.

In some embodiments, the matching engine 200 selects the provider who is closest to the origin location or who will take the least amount of time to travel to the origin location (e.g., having the shortest estimated travel time to the origin location based on routing and map information from a data source). The matching engine 200 sends an assignment request to the selected provider. If the provider accepts the assignment request, then the matching engine 200 assigns the provider to the user. If the provider rejects the assignment request, then the matching engine 200 selects another provider and sends a subsequent assignment request to the client device 110 for that provider. In varying embodiments, the providers may be selected to provide any suitable service, such as providing a trip to a rider, or retrieving and transporting a package, and/or any other travel-related service in which the provider may provide sensor data for verification by the network system 100.

The map data store 205 stores map information of geographic regions in which the network system 100 offers services such as transportation for users. The maps contain information about roads within the geographic regions. For the purposes of this disclosure, roads can include any route between two places that allows travel by foot, motor vehicle, bicycle, or other suitable form of travel. Examples of roads include streets, highways, freeways, trails, bridges, tunnels, toll roads, or crossings. Roads may be restricted to certain users, or may be available for public use.

The map data store 205 also stores properties of the map, which can include road properties that describe characteristics of the road segments, such as speed limits, road directionality (e.g., one-way or two-way), traffic history, traffic conditions, addresses on the road segment, length of the road segment, and type of the road segment (e.g., surface street, residential, highway, toll). The map properties also can include properties about intersections, such as turn restrictions, light timing information, throughput, and connecting road segments. In some embodiments, the map properties also include properties describing the geographic region as a whole or portions of the geographic region, such as weather within the geographic region, geopolitical boundaries (e.g., city limits, county borders, state borders, country borders), and topological properties.

The data processing engine 220 receives data associated with sensor information and associated with a trip record. The data includes one or more data samples captured by one or more sensors, e.g., of a client device 110 or standalone sensors. The data also may include one or more characteristics (e.g., metadata) of the data sample(s). The characteristics include, e.g., an origin or destination location of the trip record, a route of the trip record, a type of client device 110 that provided the data, or information describing a user of the client device 110. The data processing engine 220 may receive the data directly from a sensor (e.g., of a vehicle of a provider) or indirectly, for example, from a client device 110 including sensors or another system via the network 130. The data processing engine 220 may store the data in the user data store 210 and associate the data with the corresponding service. In addition, the data processing engine 220 may organize the data based on segments (e.g., of routes for a trip) and associate (e.g., index) the data with one or more of the characteristics. Thus, the network system 100 can retrieve stored embeddings based on a particular reference characteristic of interest.

In some embodiments, the data processing engine 220 implements signal-processing techniques such as filtering or noise reduction to pre-process data samples before further processing by the network system 100. For example, sensor data from a motion sensor such as an accelerometer includes raw acceleration readings in one or more axis of motion over a sample duration of time. The data processing engine 220 can integrate the raw acceleration readings to determine the speed of movement of a client device 110, and in extension of a vehicle within which the client device is located, for instance. As another example, sensor data from a GPS sensor includes a set of GPS coordinates. The data processing engine 220 can determine the speed of the client device 110 based on the change of position over time as indicated by the set of GPS coordinates. In some embodiments, the data processing engine 220 receives embeddings and any associated characteristics, for example, from a client device 110 that can generate the embeddings. The data processing engine 220 may store the received embeddings in the embedding data store 235, e.g., for further processing by the embedding engine 230.

The embedding engine 230 generates embeddings to represent data samples received by the data processing engine 220. In particular, the embedding engine 230 may generate embeddings for a given portion of a trip, termed a test embedding, and an embedding to which the network system 100 compares a test embedding, termed a reference embedding. The network system 100 may use a similarity between the test and reference embedding to determine if the test embedding is similar to the reference embedding generated for other trips having one or more of the same (or similar) characteristics to the test embedding and thereby verify the test embedding was generated during a trip having those characteristics. For example, the embedding engine 230 can use embeddings to associate portions of a trip with specific routes or road segments. The embedding engine 230 stores embeddings in the embedding data store 235.

In one embodiment, the embedding engine 230 generates a symbolic representation of the data sample for the embedding. In other embodiments, the embedding engine 230 uses a number of latent dimensions in latent space to represent the data sample for the embedding. The embedding engine 230 can determine similarity scores between two or more different embeddings, e.g., or by comparing each latent dimension of the different embeddings, by determining a cosine similarity between the embeddings, or by using symbolic processing on discretized sensor traces. Based on a similarity score, the embedding engine 230 may verify that sensors captured a data sample of an embedding while the sensors were subject to characteristics corresponding to the data sample.

In one embodiment, the embedding engine 230 uses symbolic aggregate approximation (SAX) to generate symbolic representations of data samples as embeddings. In an example SAX process, the embedding engine 230 performs z-normalization to scale values of a data sample to a particular range of values, e.g., from −1 to 1. The embedding engine 230 generates a piecewise aggregate approximation of the normalized data sample, e.g., converting the data sample (an analog time series) into discretized values. To generate a symbolic representation, the embedding engine 230 bins (e.g., using an equal depth quantization process) the discretized values into different symbols based on a particular mapping. For instance, different ranges of values from −1 to 1 are mapped to one of the symbols "A," "B," "C," or "D" for binning. Additional details regarding SAX algorithms are described in "SAX-VSM: Interpretable Time Series Classification Using SAX and Vector Space Model" by Pavel Senin and Sergey Malinchik published in the 2013 IEEE 13th International Conference on Data Mining (ICDM), and "Finding Structural Similarity in Time Series Data Using Bag-of-Patterns Representation" by Jessica Lin and Yuan Li published in the 2009 International Conference on Scientific and Statistical Database Management.

The embedding engine 230 can analyze symbolic representations of data samples using natural language processing techniques such as bag-of-words, bag-of-patterns, Levenshtein distance, information retrieval, n-grams, or other types of classification or topic modeling techniques. In an example use case implementing bag-of-patterns, the embedding engine 230 determines the frequencies at which certain patterns of symbols occur in a symbolic representation of a data sample. For instance, if the symbols used are "A," "B," "C," and "D," the patterns (or "words") may include "A," "AA," "AB," "BC," "AAA," etc. The embedding engine 230 can apply a sliding window to the symbolic representation to generate a vector of frequencies of different patterns. By comparing the symbolic representations (embeddings) of data samples based on the frequencies of symbols or patterns, the embedding engine 230 can determine a similarity score between embeddings. In addition to SAX and natural language processing, the embedding engine 230 may generate embeddings using other types of models, e.g., machine learning models described below.

The machine learning engine 240 uses machine learning techniques to train a model to generate embeddings for data samples. The machine learning engine 240 trains models based on feature vectors derived from data samples captured for trip records of the network system 100. The machine learning engine 240 may implement machine learning techniques such as deep learning, logistic regression, convolutional neural networks, or other types of dimensionality reduction processes. In some use cases for training models, the feature vectors are labeled based on characteristics of the data samples. For example, the labels indicate that the feature vectors include sensor data captured by sensors of a client device 110 of a user (or provider) traveling on a particular route for a trip, traveling in a particular geographical region, traveling in a particular type of vehicle, or traveling in a particular time (or range of times) of day. The labels may also indicate that the data samples are associated with a particular user (or provider), with a particular type of client device 110, or with a certain event, e.g., a safety incident such as a car accident or a geophysical event such as an earthquake.

Based on training with feature vectors, the model learns to infer latent variables based on the data samples of the feature vectors. The trained model generates embeddings that use a number of latent dimensions in latent dimension space to represent data samples, where the latent dimensions correspond to the inferred latent variables. The trained model can generate embeddings using the same number of latent dimensions independent of the duration of time of a data sample. Thus, the embedding engine 230 can compare and generate similarity scores for data samples having different durations of time.

In some embodiments, the trained model learns to generate embeddings that have the additive property. As an example, the trained model generates a first embedding and a second embedding to represent a first data sample and a second data sample, respectively. The first data sample and the second data sample are different portions of the same full data sample. For instance, the first data sample represents sensor data captured during the first ten minutes of the full data sample and the second data sample represents sensor data captured during the next ten minutes of the full data sample. In some embodiments, the portions of the full data sample are not necessarily adjacent in time, and the portions may overlap in time. The trained model generates a third embedding for the full data sample. The embeddings are additive because the embedding engine 230 can aggregate the first embedding and the second embedding to generate the third embedding, e.g., without any undesired data loss. The machine learning engine 240 may train the model using consistency with the additive property as a loss function. In other embodiments, the trained model can learn to generate embeddings that have other types of properties, e.g., subtractive, transitive, commutative, etc.

In some embodiments, the network system 100 can deploy a trained model to a client device 110 so that the client device 110 can perform some or all functionality of the embedding engine 230. For example, the machine learning engine 240 trains the model on a backend server of the network system 100 because the training process is computationally expensive and requires access to large sets of training data. However, a trained model can generate embeddings and similarity scores for embeddings using fewer computational resources relative to the training process. Thus, the client device 110 with a trained model can perform real-time analysis of data samples using embeddings.

Representing data samples using latent variables may be advantageous, for example, because the embedding reduces the dimensionality of the data samples (e.g., via a symbolic representation using SAX or by another trained model). Accordingly, the embedding engine 230 can use the embeddings as a method of data compression. For instance, the network system 100 receives a large number (e.g., tens to hundreds of thousands) of data samples associated with trip records each day for services provided by providers to users. Storing, indexing, or searching previously stored trip records that are uncompressed may be computationally expensive (e.g., require significant CPU usage and storage resources). Thus, compressing the data samples using embeddings allows the network system 100 to save computational resources and enable more efficient look-up of embeddings. In other words, e.g., the embeddings serve as a "fingerprint" of the data samples.

Further, the embedding engine 230 can store embeddings along with associated characteristics in the embedding data store 235 (e.g., as reference embeddings) and organize embeddings based on corresponding characteristics (e.g., characteristics in common). In some embodiments, the network system 100 includes multiple embedding data stores 235 at different data center locations, e.g., for load-balancing and fallback functionality. Thus, the embeddings can also normalize data samples from the different data centers.

In addition, generating embeddings using latent dimensions normalizes data samples from a heterogeneous set of sensors. For example, the network system 100 may receive data samples that are supposed to be captured by an IMU and a GPS sensor of the same client device 110. The embedding engine 230 can determine a similarity score between an embedding of a data sample from the IMU and another data sample from the GPS sensor. Based on the similarity score, the embedding engine 230 can determine a likelihood that the data samples the IMU and GPS sensor actually captured. A client device 110 may have a GPS "spoofer" that provides fictitious data samples to the network system 100, in some embodiments. A provider of the client device 110 can use the GPS "spoofer" to provide fictitious data samples indicating that the provider provided a service, even though the provider did not actually provide the service. For example, the fictitious data samples indicate that the client device 110 traveled along a route to transport a user in a vehicle, but the provider instead stayed home, traveled along a different route, or traveled only for a portion of the route.

In some embodiments, personnel of the network system 100 can analyze trip records of services provided by providers using the embeddings stored in the embedding data store 235. In one use case, the personnel identify a suspected anomaly in data samples for a particular transportation service (e.g., a trip) and want to investigate to determine a possible cause of the anomaly. For example, the anomaly indicates that sensor data of the data sample has an average speed of a vehicle that is slower than expected for the particular trip, e.g., based on historical trip record data from the user data store 210. The personnel may make a hypothesis that a "spoofer" of a provider's client device 110 generated the sensor data. The embedding engine 230 searches the embedding data store 235 for reference embeddings with characteristics that correspond to characteristics of an embedding of the data sample. In other words, the embeddings allow the network system 100 to perform a controlled experiment in the sense that matching characteristics of the embeddings helps isolate the average speed of the vehicle as a variable to test the hypothesis. Other variables such as the route of the trip or the time of day of the trip may be controlled variables, and the reference embedding serves as the "control group" for the controlled experiment, e.g., a reference for comparison.

III. Example Embedding Representation of Sensor Data

Figure 3A:
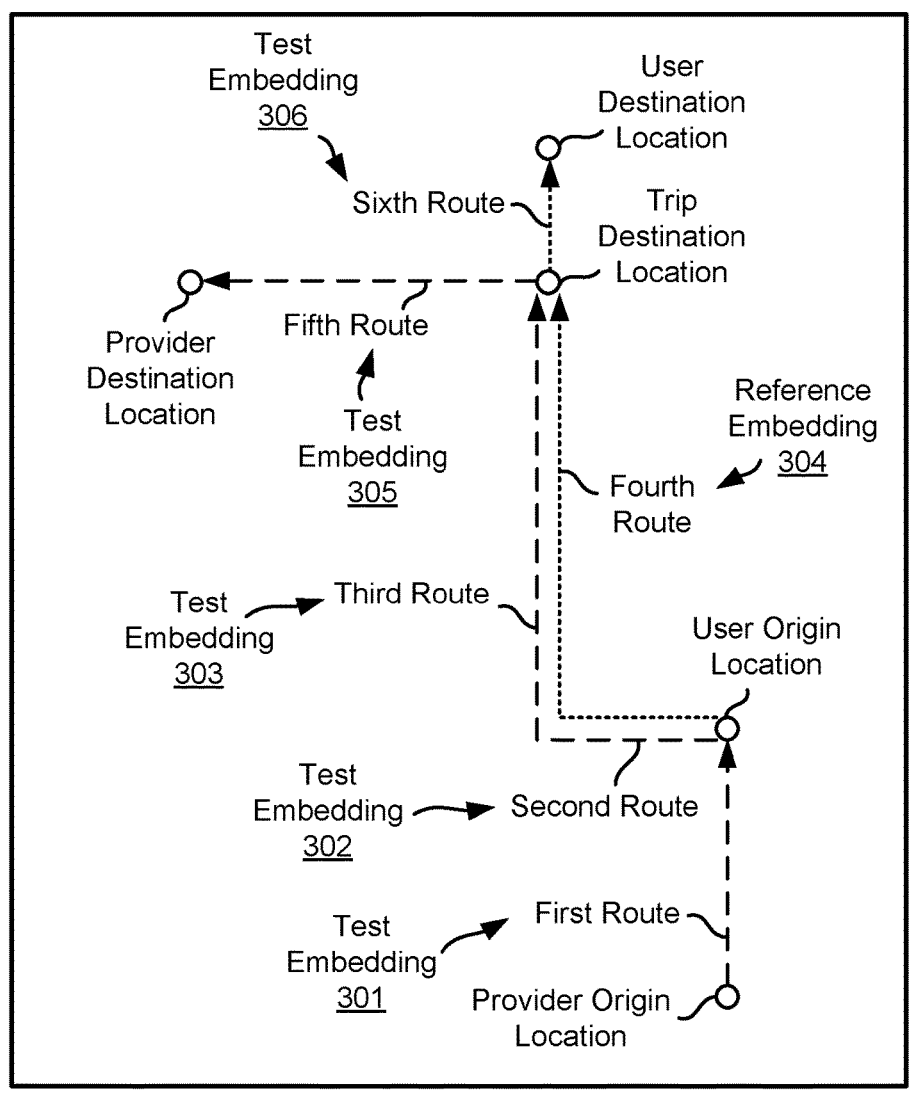
FIG. 3A is a diagram of routes of a trip traveled by a user of the network system according to one embodiment.

FIG. 3A is a diagram 300 of routes of a trip traveled by a user of the network system 100 according to one embodiment. As shown in FIG. 3A, a provider and a user travel along various routes including some routes that overlap and other routes that do not overlap. The embedding engine 230 generates test embeddings for each route based on data samples received from the client device 110 of the user and/or the provider while the user and/or provider are traveling along the corresponding route.

In an example use case, a user at the user origin location (e.g., as indicated by geographical location information from the user's client device 110), requests transportation service from the network system 100. The matching engine 200 matches the user with a provider at the provider origin location. Since the provider origin location does not coincide with the user origin location, the provider travels in the provider's vehicle along a first route to the user origin location to pick up the user. The embedding engine 230 generates Test Embedding 301 to represent data samples received for the first route from the provider origin location to the user origin location.

Once the provider picks up the user, the provider and user travel along a second and third route (e.g., a segment of a road) to the trip destination location, where the provider drops off the user. The embedding engine 230 generates Test Embeddings 302 and 303 to represent data samples received for the second and third routes, respectively. The embedding engine 230 can also generate Reference Embedding 304 to represent data samples received for the second and third routes, which together form the fourth route. After dropping off the user, the provider travels along a fifth route to the provider destination location. For instance, the provider is returning home or traveling to another location to pick up or wait for another user requesting transportation service. The embedding engine 230 generates Test Embedding 305 to represent data samples received for the fifth route. After the provider drops off the user, the user travels along a sixth route to the user destination location. For instance, the user was dropped off at the entrance of a mall plaza and walks to a specific store, or the user was dropped off at a public transit station and takes another form of transportation home (e.g., the bus, train, personal vehicle, bike, or by foot). The embedding engine 230 generates Test Embedding 306 to represent data samples received for the sixth route.

Figure 3B:
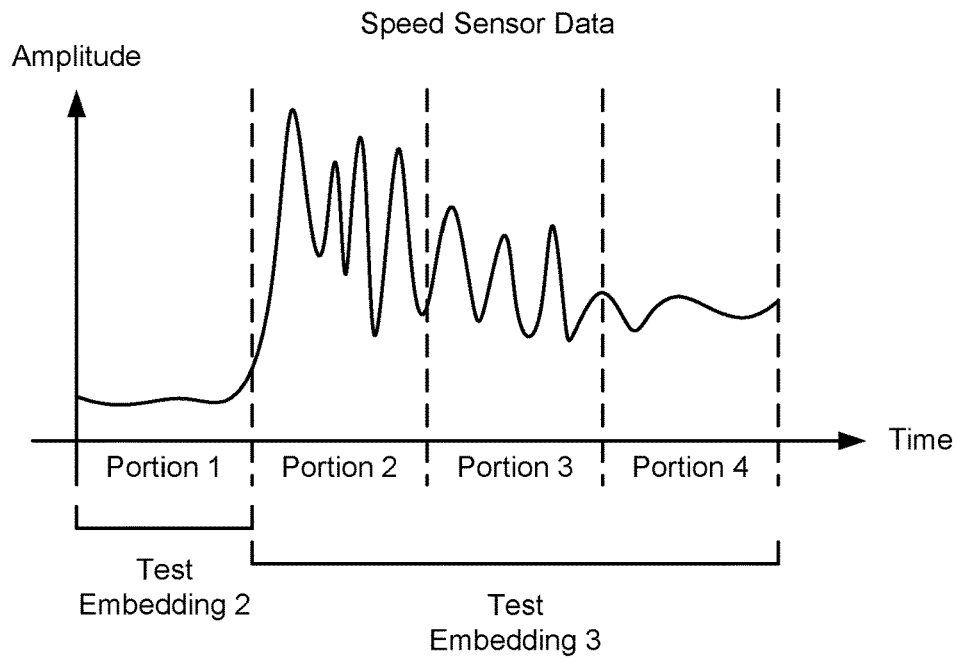
FIG. 3B is a graph of sensor data captured for the trip shown in FIG. 3A according to one embodiment.

FIG. 3B is a graph 310 of sensor data captured for the trip shown in FIG. 3A according to one embodiment. In this example, the sensor data relates to a speed sensor that describes the speed of a client device 110, though the network system 100 may analyze any other suitable sensor as described herein. The example graph 310 shown in FIG. 3A plots the magnitude of example speed sensor data over time. The speed sensor data is determined based on one or more data samples received from a sensor of a client device 110 of the user or the provider of the trip (e.g., by integrating acceleration data from an IMU or a GPS sensor). In particular, the data samples are captured while the client device 110 travels along the second and third routes of the trip. The embedding engine 230 can determine multiple portions of the data samples, where a given route is associated with one or more portions of data samples, e.g., the second route is associated with portion 1, and the third route is associated with portions 2, 3, and 4. Each portion of sensor data may represent the data samples for a given duration in time. Thus, the third route is associated with more portions than the second route because the provider and user traveled for a longer duration of time on the third route than on the second route.

In one embodiment, the embedding engine 230 generates an embedding for each period of the trip corresponding to the given duration in time, and may combine the embeddings to characterize a portion of the trip. For example, the embedding engine 230 generates an embedding from the sensor date every 30 seconds or minute (or another suitable duration). When the embeddings are of interest for analysis, the embedding engine 230 may combine the embeddings for a given portion of a route to analyze that portion of the route, such as portion 2, portion 3, and portion 4 to generate Test Embedding 303 corresponding to the third route of this example trip.

Figure 3C:
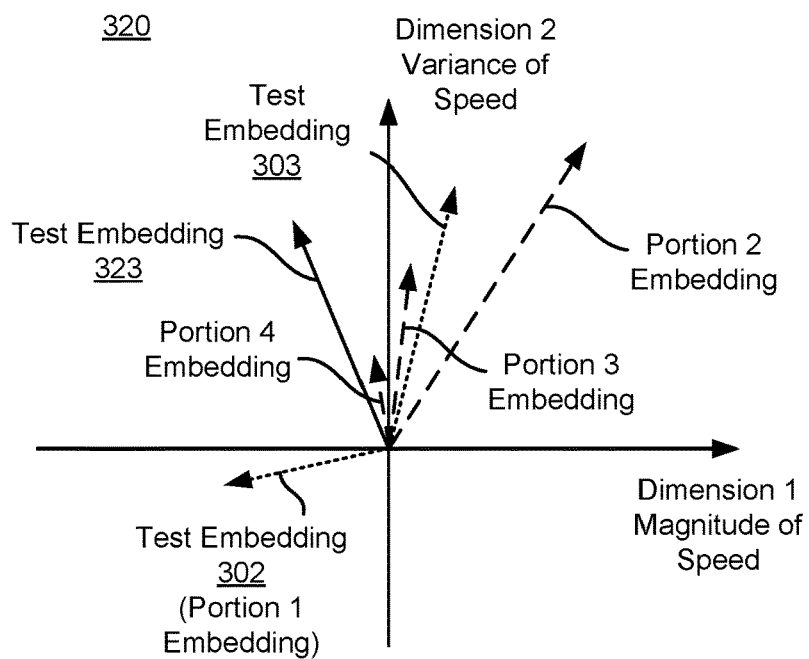
FIG. 3C is a diagram of embeddings in latent dimension space representing the sensor data shown in FIG. 3B according to one embodiment.

FIG. 3C is a diagram 320 of embeddings in latent dimension space representing the sensor data shown in FIG. 3B according to one embodiment. The embedding engine 230 generates embeddings for each of the portions shown in the graph 310 in FIG. 3B. In particular, the embedding engine 230 generates Portion 1 Embedding, Portion 2 Embedding, Portion 3 Embedding, and Portion 4 Embedding to represent data samples from portions 1, 2, 3, and 4, respectively, using two latent dimensions. For convenience, in the example diagram 320, the first latent dimension is associated with the magnitude of speed of the sensor data and the second latent dimension is associated with the variance of speed of the sensor data. Accordingly, sensor data with greater magnitude and variance in speed will be represented by embeddings having greater latent values in the first and second latent dimensions, respectively. Though corresponding to "magnitude" and "variance" of speed in this example for convenience, in other examples, the latent values may not (and typically do not) correspond to any easily labeled characteristics of the sensor data, and rather represent learned characteristics of interest in the sensor data.

Referring to the graph 310, the sensor data of portion 1 has a low magnitude and low variance relative to the other portions shown in the graph 310. For example, the first route of the trip includes a straightaway road in a residential area with a low speed limit (e.g., 15 miles per hour). Thus, the Portion 1 Embedding has a low latent value for both the first and second latent dimensions. In contrast, the sensor data of portion 2 has a high magnitude and high variance relative to the other portions shown in the graph 310. For example, the second route of the trip includes an expressway road that has a high speed limit (e.g., 50 miles per hour) and also has several stop lights (e.g., causing the provider to frequently change the speed of the vehicle or perform hard brakes and accelerations at the stop lights). Thus, the Portion 2 Embedding has a high latent value for both the first and second latent dimensions. The sensor data of portions 3 and 4 have magnitudes and variances that fall in between those of portions 1 and 2. Thus, the Portion 3 magnitudes and Portion 4 Embedding have latent values for the first and second latent dimensions in between those of portions 1 and 2 as well.

Since the embeddings have the additive property in some embodiments, the embedding engine 230 can generate Test Embedding 303 by combining or adding the Portion 2 Embedding, Portion 3 Embedding, and Portion 4 Embedding of the third route. For example, the embedding engine 230 may generate Test Embedding 303 by combining embeddings of its constituent portions that, because of the additive property, is the equivalent of generating an embedding from the entire sensor data corresponding to the second route. Stated as another example way, $E(P_1-P_3)=E(P_1)+E(P_2)+E(P_3)$ where $E(\ )$ is a function or model for generating an embedding from sensor data. Since the second route is associated with one portion (portion 1), the embedding engine 230 uses the Portion 1 Embedding as Test Embedding 302. The second and third routes were traveled by both the user and the provider for the trip. Thus, the embedding engine 230 can generate a single embedding, Test Embedding 323, to represent the common routes of the trip by adding Test Embedding 302 and Test Embedding 303.

In an example use case, the network system 100 determines that a provider and a user are nearby each other using geographical location data from their respective client devices 110. The network system 100 determines whether the provider and user are taking a trip together based on subsequent sensor data received from the client devices 110. In particular, the network system 100 compares a first set of test embeddings generated based on sensor data received from the user's client device 110 with a second set of test embeddings generated based on sensor data received from the provider's client device 110. Using the comparison, the network system 100 can determine one or more routes traveled by both the provider and user as indicated by similarities in the corresponding test embeddings.

In addition, the network system 100 may determine a value of the trip (transportation service) based on the routes traveled by both the provider and user, in some embodiments. The network system 100 can determine the value of the trip based at least on the distance traveled and/or duration of time of a trip, and the value represents an amount of compensation that the user provides to the network system 100 in return for receiving the transportation service provided by the provider. To determine a compensation that accurately represents the portions of the trip traveled by both the user and the provider (e.g., a fair fare), the network system 100 uses, e.g., Test Embedding 323, which does not account for the portions of the trip traveled by only one of the provider or the user (e.g., the first route, fifth route, and sixth route shown in FIG. 3A).

Though FIG. 3C shows an example latent dimension space including two dimensions, in other embodiments, the embedding engine 230 may generate embeddings using any number of latent dimensions (e.g., hundreds or thousands of dimensions), and the latent dimensions can be associated with latent variables other than variance and magnitude of speed.

IV. Example Comparison of Embeddings

Figure 4A:
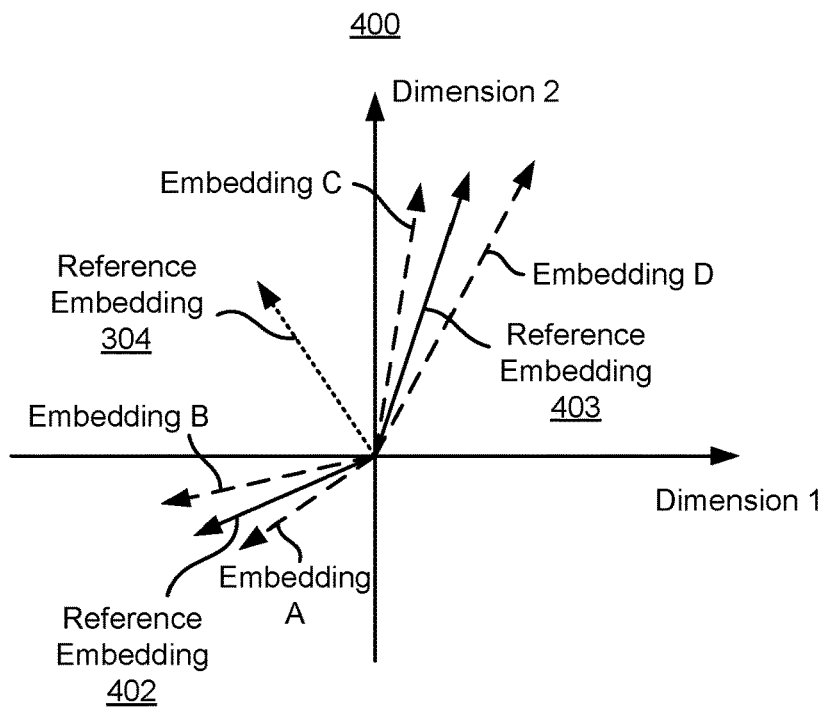
FIG. 4A is a diagram of reference embeddings in latent dimension space according to one embodiment.

FIG. 4A is a diagram 400 of reference embeddings in latent dimension space according to one embodiment. The embedding engine 230 can retrieve embeddings from the embedding data store 235 to be used as a reference for analyzing the test embeddings shown in FIG. 3C. For example, the embedding engine 230 retrieves Embeddings A and B, which represent data samples and sensor data received from client devices 110 of other users or providers of the network system 100 who previously traveled along the second route corresponding to Test Embedding 302, as shown in FIG. 3A. In addition, the embedding engine 230 retrieves Embeddings C and D, which represent data samples and sensor data received from client devices 110 of other users or providers of the network system 100 who previously traveled along the third route corresponding to Test Embedding 303. In addition, Embeddings A, B, C, and D may use the same number (and types) of latent dimensions as the test embeddings shown in FIG. 3C.

In some embodiments, due to the additive property of the embeddings, the embedding engine 230 generates Reference Embedding 402 by adding Embeddings A and B, and the embedding engine 230 generates Reference Embedding 403 by adding Embeddings C and D. To represent both the second and third routes traveled by both the user and the provider for the trip, the embedding engine 230 generates Reference Embedding 304 by adding Reference Embedding 402 and Reference Embedding 403.

The Reference Embedding 304 is associated with a set of reference characteristics. The set of reference characteristics indicate that the Reference Embedding 304 represents sensor data for trip records associated with providers and/or users who traveled along the second and third routes. Similar to the set of reference characteristics, the Test Embedding 323 has characteristics (e.g., of the data sample used to generate Test Embedding 323) that are also associated with the second and third routes. Thus, the embedding engine 230 can search for and retrieve reference embeddings stored in the embedding data store 235 by comparing characteristics of data samples (e.g., for test embeddings) with reference characteristics of reference embeddings.

Figure 4B:
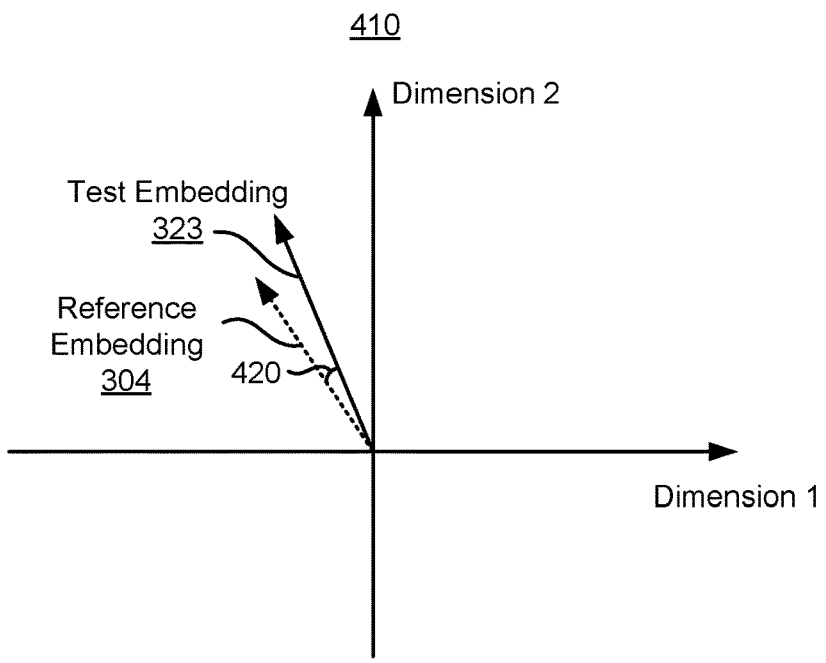
FIG. 4B is a diagram showing a comparison of different embeddings in latent dimension space according to one embodiment.

FIG. 4B is a diagram 410 showing a comparison of different embeddings in latent dimension space according to one embodiment. The embedding engine 230 determines a similarity score between the Test Embedding 323 and the Reference Embedding 304 based on the reference angle 420. For instance, the similarity score is proportional to the cosine similarity of the reference angle 420 because a smaller angle indicates a greater level of similarity. In other embodiments, embedding engine 230 can determine similarity scores using other statistical models such as Pearson correlation, ordinary least squares (OLS), or linear least squares. If a similarity score is greater than a threshold value (or score), the embedding engine 230 may verify the sensor data of the data sample matches the expected characteristics as represented by the reference embeddings. In this example, that the sensor data received from the provider's client device 110 matches reference data for the second and third routes. For example, the embedding engine 230 may then verify that the provider did indeed travel along the second and third routes to transport the user for the trip (that the sensor data is not a spoof or fictitious).

As another example use case, the embedding engine 230 generates Reference Embedding 304 (indicated in FIG. 3A) to represent data samples received from the user's client device 110 during the second and third routes of the trip. The embedding engine 230 determines a similarity score between the Test Embedding 323 and Reference Embedding 304. If the similarity score is greater than a threshold score, the embedding engine 230 can determine that the provider and user both traveled along the same second and third routes. The embedding engine 230 can also determine the distance of the routes that the provider and user both traveled. In other use cases, the embedding engine 230 may compare test embeddings with reference embeddings to verify other information based on similarity scores, e.g., whether a geophysical event occurred during a trip or whether the provider's vehicle is involved in a safety incident.

V. Example Process Flow

FIG. 5 is a flowchart illustrating a process 500 for verifying sensor data according to one embodiment. In some embodiments, the process 500 is used by the network system 100—e.g., modules of the network system 100 described with reference to FIG. 2—within the system environment in FIG. 1. The process 500 may include different or additional steps than those described in conjunction with FIG. 5 in some embodiments or perform steps in different orders than the order described in conjunction with FIG. 5.

In one embodiment, the data processing engine 220 receives 510 data including a data sample for a set of sensors and one or more characteristics of the data sample. The data sample is received from a client device 110, and the data sample is associated with sensor information of the client device 110. The data sample is also associated with a trip record, e.g., including information for a transportation service provided by a provider to a user of the network system 100 using a vehicle. As one use case, referring to FIG. 3A, the trip record indicates that the provider will transport the user from the user origin location to the trip destination location along the second and third routes (e.g., characteristics of the data sample) as shown in the diagram 300. The sensor information may be sensor data captured by the set of sensors of the client device 110. However, the sensor information may also be fictitious sensor information provided by the client device 110 in an attempt to "spoof" the network system 100.

The embedding engine 230 generates 520 a test embedding for the data sample. The test embedding uses a number of latent dimensions that represent at least a portion of the data sample. For example, the embedding engine 230 compares the average magnitude and variance of speed of the vehicle along each route traveled for the transportation service. The embedding engine 230 identifies 530 a reference embedding for a set of reference characteristics, where the set of reference characteristics corresponds to at least one of the one or more characteristics of the data sample. The embedding engine 230 generates the reference embedding based on a set of embeddings each using the number of latent dimensions that represent sensor data for a set of trip records associated with the set of reference characteristics. For example, referring to FIGS. 4A-B the set of embeddings includes Embeddings A, B, C, and D that represent data samples previously received from client devices 110 of other users or providers who traveled along the same second and third routes. Accordingly, the Reference Embedding 323 shown in FIGS. 4A-B is for a set of reference characteristics also indicating the second and third routes. Thus, the set of reference characteristics corresponds to the characteristics of the data sample.

The embedding engine 230 determines 540 a similarity score between the test embedding corresponding to the trip record and the reference embedding by comparing each latent dimension of the test embedding and a corresponding latent dimension of the reference embedding. The embedding engine 230 may determine the similarity score using the cosine similarity angle between the test embedding and the reference embedding. The embedding engine 230 verifies 550 that the data sample was captured while the set of sensors were subject to the set of reference characteristics, e.g., the set of sensors of the provider's client device 110 were traveling along the second and third routes shown in FIG. 3A. The embedding engine 230 may verify the data sample in response to the similarity score exceeding a threshold score, for example.

In other embodiments, the embedding engine 230 verifies information about data samples using other types of characteristics in addition, or alternatively, to routes traveled as indicated by a trip record for transportation service. For instance, the reference embeddings represent data samples that were captured during a particular timestamp, time of day, or geographical region. Thus, the embedding engine 230 can determine whether a user traveled a given route of a trip record within a threshold duration of time from when other users traveled the same given route. Traffic conditions for a particular road segment may vary significantly between the morning, afternoon, and evening hours of the day, e.g., due to rush hour or road construction projects. Further, vehicle operation patterns may vary from one city or country to another. For example, some countries do not have lane markers on roads, which results in a greater amount of vehicle swerving in comparison to countries with lane markers on roads. As another example, some cities have different turn restrictions (e.g., one-way streets in urban areas), boundaries, or weather conditions that influence the behavior of a provider navigating through the city. Thus, to generate a more accurate reference embedding for comparison, the embedding engine 230 identifies data samples based on other corresponding characteristics such as temporal or geographical region information. In some embodiments, the corresponding characteristics may be based on user information from the user data store 210 or other parameters that describe data samples.

VI. Example Physical Components of a Computer

Figure 6:
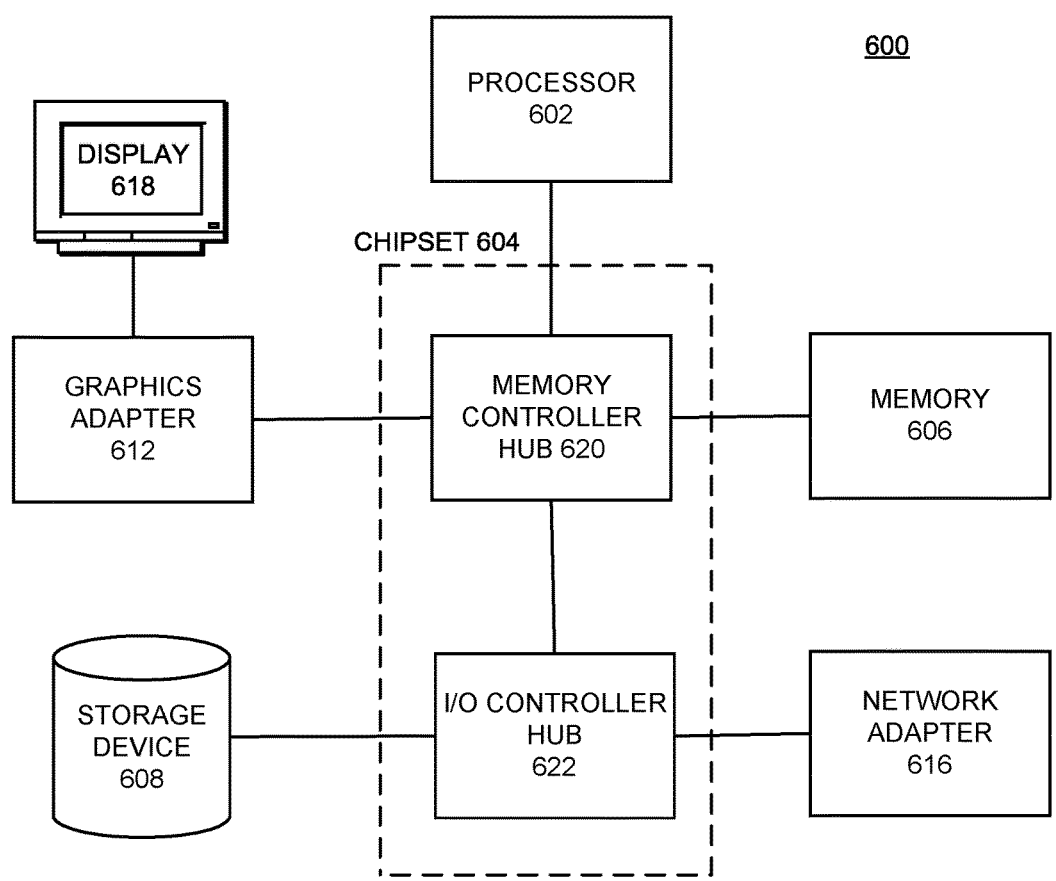
FIG. 6 is a high-level block diagram illustrating physical components of a computer used as part or all of the components from FIG. 1, according to one embodiment.

FIG. 6 is a high-level block diagram illustrating physical components of a computer 600 used as part or all of the components from FIG. 1 (e.g., the network system 100 or client devices 110A and 110B), according to one embodiment. Illustrated are at least one processor 602 coupled to a chipset 604. Also coupled to the chipset 604 are a memory 606, a storage device 608, a graphics adapter 612, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The graphics adapter 612 displays images and other information on the display 618. The network adapter 616 couples the computer 600 to a local or wide area network.

As is known in the art, a computer 600 can have different and/or other components than those shown in FIG. 6. In addition, the computer 600 can lack certain illustrated components. In one embodiment, a computer 600 such as a server or smartphone may lack a graphics adapter 612, and/or display 618, as well as a keyboard or pointing device. Moreover, the storage device 608 can be local and/or remote from the computer 600, e.g., embodied within a storage area network (SAN).

As is known in the art, the computer 600 is adapted to execute computer program modules or engines for providing functionality described herein. As used herein, the terms "module" or "engine" refer to computer program logic utilized to provide the specified functionality. Thus, a module and/or engine can be implemented in hardware, firmware, and/or software. In one embodiment, program modules and/or engines are stored on the storage device 608, loaded into the memory 606, and executed by the processor 602.

VII. Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for verifying a trip for a user and a trip provider, the method comprising:
   receiving, from a client device, data associated with sensor information of the client device and associated with a trip record, the trip record being associated with the trip for the user and the trip provider, the data including (i) a data sample for a set of sensors of the client device and (ii) one or more characteristics of the data sample;
   generating a test embedding for the data sample, the test embedding using a plurality of latent dimensions that represent at least a portion of the data sample;
   identifying a reference embedding for a set of reference characteristics, the set of reference characteristics corresponding to at least one of the one or more characteristics of the data sample, the reference embedding being based on a set of embeddings each using the plurality of latent dimensions that represent sensor data for a set of trip records different than the trip record, the set of trip records being associated with the set of reference characteristics;
   determining a similarity score between the test embedding corresponding to the trip record and the reference embedding by comparing each latent dimension of the test embedding and a corresponding latent dimension of the reference embedding;
   verifying, in response to the similarity score exceeding a threshold score, that the data sample was captured while the set of sensors were subject to the set of reference characteristics; and
   in response to the verification that the data sample was captured while the set of sensors were subject to the set of reference characteristics, determining that the trip provider and the user traveled together along at least a portion of a route of the trip.

2. The method of claim 1, wherein the test embedding and the reference embedding are generated using a model trained based at least in part on feature vectors derived from data samples captured for the set of trip records.

3. The method of claim 1, wherein the portion of the data sample has a first duration in time, and wherein generating the test embedding comprises:
   generating a plurality of embeddings for a plurality of sub-portions of the portion of the data sample, each of the sub-portions having a second duration in time less than the first duration in time; and aggregating the plurality of embeddings.

4. The method of claim 1, wherein the user is associated with the client device and the trip record, wherein the set of trip records includes at least a sample trip taken by a second user, and wherein the set of embeddings includes a sample embedding representing sample sensor data captured for the sample trip by another set of sensors of another client device of the second user.

5. The method of claim 4, wherein the sample trip includes a plurality of routes, and further comprising:
determining a route of the plurality of routes traveled by both the user and the second user based at least in part on the similarity score.

6. The method of claim 1, wherein the set of trip records includes at least the trip record, and wherein the set of embeddings includes a sample embedding representing sample sensor data captured for the trip record by another sensor of the client device not included in the set of sensors.

7. The method of claim 1, wherein the one or more characteristics of the data sample includes at least one of: an origin or destination location of the trip record, a route of the trip record, a type of the client device, or the user.

8. The method of claim 1, further comprising:
determining that the one or more characteristics of the data sample describe a geophysical event;
determining, for the trip record, a likelihood score that the geophysical event occurred based at least in part on the similarity score, and wherein the set of reference characteristics is associated with the geophysical event.

9. The method of claim 1, wherein the client device is transported in a vehicle, and wherein the method further comprises: determining that the one or more characteristics of the data sample describe a safety incident; determining that the vehicle was involved in the safety incident based at least in part on the similarity score.

10. A method for verifying a trip for a user and a trip provider, the method comprising:
receiving, from a client device of the user, data associated with sensor information of the client device and associated with a trip record, the trip record being associated with the trip for the user and the trip provider, the data including (i) a data sample for a set of sensors of the client device and (ii) one or more characteristics of the data sample;
generating a test embedding for the data sample, the test embedding using a plurality of latent dimensions that represent at least a portion of the data sample;
identifying a reference embedding for a set of reference characteristics, the set of reference characteristics corresponding to at least one of the one or more characteristics of the data sample, the reference embedding being based on a set of embeddings each using the plurality of latent dimensions that represent sensor data for a set of trip records different than the trip record, the set of trip records being associated with the set of reference characteristics, the reference embedding generated using a model trained based at least in part on feature vectors derived from data samples captured for the set of trip records;
determining a similarity score between the test embedding corresponding to the trip record and the reference embedding by comparing each latent dimension of the test embedding and a corresponding latent dimension of the reference embedding;
verifying that the similarity score exceeds a threshold score; and
in response to the verification that the similarity score exceeds the threshold score, determining that the user and the trip provider traveled together along at least a portion of a route of the trip using the data sample.

11. The method of claim 10, further comprising: determining a different route along which only the user or the trip provider traveled for the trip.

12. A computer program product comprising a non-transitory computer readable storage medium having instructions, for verifying a trip for a user and a trip provider, encoded thereon that, when executed by one or more processors, cause the one or more processors to:
receive, from a client device, data associated with sensor information of the client device and associated with a trip record, the trio record being associated with the trip for the user and the trip provider, the data including (i) a data sample for a set of sensors of the client device and (ii) one or more characteristics of the data sample;
generate a test embedding for the data sample, the test embedding using a plurality of latent dimensions that represent at least a portion of the data sample;
identify a reference embedding for a set of reference characteristics, the set of reference characteristics corresponding to at least one of the one or more characteristics of the data sample, the reference embedding being based on a set of embeddings each using the plurality of latent dimensions that represent sensor data for a set of trip records different than the trip record, the set of trip records being associated with the set of reference characteristics;
determine a similarity score between the test embedding corresponding to the trip record and the reference embedding by comparing each latent dimension of the test embedding and a corresponding latent dimension of the reference embedding;
verify, in response to the similarity score exceeding a threshold score, that the data sample was captured while the set of sensors were subject to the set of reference characteristics; and
in response to the verification that the data sample was captured while the set of sensors were subject to the set of reference characteristics, determine that the trip provider and the user traveled together along at least a portion of a route of the trip.

13. The non-transitory computer readable storage medium of claim 12, wherein the test embedding and the reference embedding are generated using a model trained based at least in part on feature vectors derived from data samples captured for the set of trip records.

14. The non-transitory computer readable storage medium of claim 12, wherein the portion of the data sample has a first duration in time, and wherein generating the test embedding comprises:
generating a plurality of embeddings for a plurality of sub-portions of the portion of the data sample, each of the sub-portions having a second duration in time less than the first duration in time; and
aggregating the plurality of embeddings.

15. The non-transitory computer readable storage medium of claim 12, wherein the user is associated with the client device and the trip record, wherein the set of trip records includes at least a sample trip taken by a second user, and wherein the set of embeddings includes a sample embedding representing sample sensor data captured for the sample trip by another set of sensors of another client device of the second user.

16. The non-transitory computer readable storage medium of claim 15, wherein the sample trip includes a plurality of routes, and having further instructions that when executed by the one or more processors cause the one or more processors to:
    determining a route of the plurality of routes traveled by both the user and the second user based at least in part on the similarity score.

17. The non-transitory computer readable storage medium of claim 12, wherein the set of trip records includes at least the trip record, and wherein the set of embeddings includes a sample embedding representing sample sensor data captured for the trip record by another sensor of the client device not included in the set of sensors.

18. The non-transitory computer readable storage medium of claim 12, wherein the one or more characteristics of the data sample includes at least one of: an origin or destination location of the trip record, a route of the trip record, a type of the client device, or the user.

19. The non-transitory computer readable storage medium of claim 12, having further instructions that when executed by the one or more processors cause the one or more processors to:
    determine that the one or more characteristics of the data sample describe a geophysical event;
    determine, for the trip record, a likelihood score that the geophysical event occurred based at least in part on the similarity score, and wherein the set of reference characteristics is associated with the geophysical event.

20. The non-transitory computer readable storage medium of claim 12, having further instructions that when executed by the one or more processors cause the one or more processors to:
    determine that the one or more characteristics of the data sample describe a safety incident;
    determine that the vehicle was involved in the safety incident based at least in part on the similarity score.

* * * * *

UNITED STATES PATENT AND TRADEMARK OFFICE
CERTIFICATE OF CORRECTION

PATENT NO. : 10,111,043 B1
APPLICATION NO. : 15/495686
DATED : October 23, 2018
INVENTOR(S) : Fahrettin Olcay Cirit Page 1 of 1

It is certified that error appears in the above-identified patent and that said Letters Patent is hereby corrected as shown below:

Column 19 In Claim 16, Line 6: "determining a route" to read as —determine a route—

Signed and Sealed this
Tenth Day of March, 2020

Andrei Iancu
*Director of the United States Patent and Trademark Office*